United States Patent [19]

Charbonneau

[11] 4,230,817
[45] Oct. 28, 1980

[54] THERMOTROPIC POLYESTERS DERIVED FROM FERULIC ACID AND A PROCESS FOR PREPARING THE POLYESTERS

[75] Inventor: Larry F. Charbonneau, Morris, N.J.

[73] Assignee: Celanese Corporation, New York, N.Y.

[21] Appl. No.: 17,007

[22] Filed: Mar. 2, 1979

[51] Int. Cl.² .............................................. C08G 63/06
[52] U.S. Cl. .................................... 528/206; 528/190; 528/191; 528/192; 528/193; 528/194
[58] Field of Search ............... 528/206, 190, 192, 193, 528/191, 194

[56] References Cited

U.S. PATENT DOCUMENTS 4,053,415  10/1977  Satomura .............................. 528/206

OTHER PUBLICATIONS

Polycondensation of Hydroxy-Trans-Cinnamic Acids under High Pressure, Tanaka et al., Proc. Int. Conf. High Pressure, 4th, (1975), pp. 704–712.

Primary Examiner—Lester L. Lee
Attorney, Agent, or Firm—Kenneth A. Genoni

[57] ABSTRACT

Thermotropic polyesters derived from ferulic acid exhibit an anisotropic melt. The polyesters may be comprised of all ferulic acid, but they preferably include one or more additional monomers. Preparation of the polyesters is typically accomplished by melt polymerization of the esterified monomer or monomers. The polymers may be melt processed into fibers, films or other molded articles which may include conventional fillers and/or reinforcing agents.

8 Claims, No Drawings

THERMOTROPIC POLYESTERS DERIVED FROM FERULIC ACID AND A PROCESS FOR PREPARING THE POLYESTERS

BACKGROUND OF THE INVENTION

1. Field of the Invention

This invention relates to thermotropic polyesters derived from ferulic acid and to a process for preparing such polyesters.

2. Description of the Prior Art

It is known in the art that light sensitive polyesters may be prepared from cinnamic acid

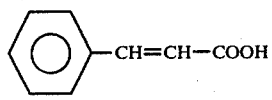

or its derivatives by reacting the acid or derivative with polyhydric alcohols and polycarboxylic acids. Thus, as described in U.S. Pat. No. 3,030,208, a light sensitive polyester may be prepared by polycondensing a polyhydric alcohol and a polycarboxylic acid with a cinnamic acid derivative having the formula:

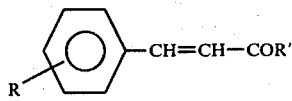

wherein R represents one or more alkyl, aryl, aralkyl, alkoxy, nitro, amino, carboxyl groups or halogen or hydrogen atoms and R' represents an OH group, a halogen atom, a hydrocarbon radical or an amine group. The light sensitivity of the polyester is derived from the cross-linkable double bond and makes the polyester particularly useful in the production of films or foils that may be used in the reproduction art.

The use of another cinnamic acid derivative, 2,5-dimethoxycinnamic acid or its lower alkyl ester, is disclosed in U.S. Pat. No. 3,600,357. As set forth therein, from about 0.01 mole percent to about 3.0 mole percent of the derivative is added to a copolyester prepared from a saturated dicarboxylic acid or its lower alkyl diester and a lower aliphatic glycol to impart optical brightness to fibers or films prepared from the copolyester.

Illustrative cinnamic acid derivatives employed in the preparation of polyesters and copolyesters and which exhibit optical anisotropy in the molten state are described in Netherlands Application No. 75,05551, filed May 1, 1975 which claims the priority of U.S. Application Ser. Nos. 468,690, 468,695 and 468,697, all filed on May 10, 1974. More particularly, the Netherlands Application discloses that p-acetoxycinnamic acid may be melt polymerized with various aromatic monomers to produce polyesters or copolyesters which may be formed into fibers, films or molded articles. A description of a number of related polyesters and copolyesters may also be found in U.S. Pat. No. 4,118,372 which is a Continuation-in-part of the aforementioned U.S. Application Ser. No. 468,697.

The homopolymerization of ferulic acid under experimental conditions is disclosed in the article by Y. Tanaka et al entitled "Polycondensation of Hydroxy-Trans-Cinnamic Acids Under High Pressure", Proc. Int. Conf. High Pressure, 4th, (1975) pp. 704–712. As the title suggests, the homopolymer is obtained by polycondensing the monomer at high pressures ranging from 10 to 80 kilobars and at temperatures ranging from 200° to 450° C. in the solid phase. The resulting homopolymer is described as being amorphous in nature.

OBJECTS AND SUMMARY OF THE INVENTION

Accordingly, it is a general object of the present invention to provide novel, thermotropic polyesters containing ferulic acid.

Another object of the present invention is to provide novel thermotropic polyesters derived from ferulic acid which exhibit anisotropy in the melt phase.

It is a further object of the present invention to provide a novel thermotropic polyester which may be wholly or partly derived from a non-petroleum feedstock.

It is a still further object of the present invention to provide a process for preparing thermotropic polyesters derived from ferulic acid.

These and other objects, as well as the scope, nature and utilization of the invention will be apparent from the following summary and detailed description of the present invention.

In accordance with one aspect, the present invention provides a thermotropic polyester capable of forming an anisotropic melt. The polyester has the recurring unit:

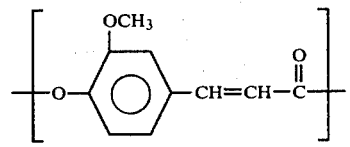

In a further aspect, the present invention provides a process for preparing a thermotropic polyester capable of forming an anisotropic melt. The process comprises:

(a) esterifying a monomer having the formula:

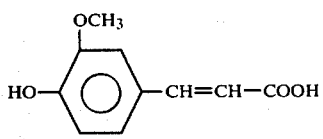

(b) heating the esterified monomer to a temperature of from about 230° to about 300° C. for from about 4 to about 8 hours;
(c) reducing the ambient pressure to from about atmospheric to about 1.0 mm. Hg;
(d) heating to a temperature of from about 280° to about 320° C. for from about 10 to about 60 minutes; and
(e) recovering the polyester.

DESCRIPTION OF PREFERRED EMBODIMENTS

As stated hereinabove, the present invention relates to a thermotropic polyester derived from ferulic acid. As used herein, the term "ferulic acid", otherwise known as 3-(4-hydroxy-3-methoxy) phenyl-2-propenoic acid, defines a compound having the formula:

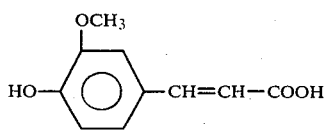

Ferulic acid is commercially available. However, it may be prepared from naturally occurring substances, such as corn hulls, or may be recovered as an additional product in the preparation of xylitol (see, for example, U.S. Pat. No. 4,038,481). Ferulic acid may also be obtained from rice hulls, as disclosed in U.S. Pat. No. 3,362,892, or as a component of softwood lignins, as described in J. Agr. Food Chem. Vol. 15(5), (1967) p. 759. It should be apparent that inasmuch as these sources of ferulic acid are unrelated to petroleum products, they will not be adversely affected by fluctuating costs and availability of crude oil.

Although there are numerous naturally occurring sources of ferulic acid, it may also be prepared synthetically. Typical techniques which may be employed are the Perkin Condensation of vanillin and acetic anhydride or the Knoevenagel reaction of vanillin with diethylmalonate (see, for example, Japanese Pat. No. 12,892 (1967)). In the interest of brevity, the previously identified article and patents disclosing the various sources of ferulic acid are hereby incorporated by reference.

Due to the presence of both a hydroxyl group and a carboxyl group in the molecule, ferulic acid may be polymerized alone to form a homopolymer capable of forming an anisotropic melt. Alternatively, ferulic acid may be copolymerized with a wide variety of other compatible monomers, preferably aromatic monomers such as hydroxy acids, diacids and diols which may or may not contain substituents on the aryl group. In this regard, while ring substitution is acceptable and, in some instances desirable, the degree of substitution should be confined such that the comonomer remains compatible and the thermotropic nature of the polyester is not substantially affected. As used herein, the term "compatible" indicates those monomers which do not degrade or otherwise adversely affect the resulting polyester. Of course, the polymer may also contain small amounts of non-aromatic material, but these materials should be limited to those amounts which do not seriously affect the advantageous characteristics of the polyester.

Illustrative of the comonomers is p- or m-hydroxy benzoic acid, 3-bromo-4-hydroxy benzoic acid, 3-chloro-4-hydroxy benzoic acid, 3,5-dichloro-4-hydroxy benzoic acid, vanillic acid (i.e., 4-hydroxy-3-methoxy benzoic acid), 6-hydroxy-2-naphthoic acid, 2,6-naphthalene dicarboxylic acid, terephthalic acid, hydroquinone, ring substituted hydroquinone, 2,6-naphthalene diol and mixtures thereof. As is well known in the art, it is preferable to stoichiometrically balance the amounts of diols and diacids, when such monomers are present, to ensure a complete reaction of the monomers.

The proportion of ferulic acid in the polyester widely varies according to the particular comonomers employed and the desired end use of the polyester. Typically, at least about 25 mole percent, and preferably from about 50 to about 75 mole percent of ferulic acid, based on the total number of moles of monomers, is present in the polyester. Thus, for example, when p-hydroxy benzoic acid or 6-hydroxy-2-naphthoic acid are present, the polymer may be comprised of from about 25 to about 75 mole percent of these monomers, individually or in combination, and from about 75 to about 25 mole percent of ferulic acid. On the other hand, where m-hydroxy benzoic acid or similar comonomers are present, the polymer may be comprised of from about 5 to about 25 mole percent of these monomers and from about 95 to about 75 mole percent of ferulic acid. The precise formulations of a particular polymer may be readily obtained by routine experimentation. In all embodiments, however, the final polyester is thermotropic in nature and is capable of forming an anisotropic melt.

Preparation of the polyester may be achieved by using various techniques. However, it is preferable to prepare the polyester by polymerizing the ester form of the ferulic acid monomer, either alone or in conjunction with the ester form of the comonomers (i.e., the monomers are provided as acyl esters). The ester groups typically have from 2 to 4 carbon atoms and are preferably present as acetate esters.

Acetylation of the monomer or monomers is typically accomplished according to the procedure of F. D. Chattaway described in J. Chem. Soc. (1931) p. 2495, the content of which is incorporated by reference. Briefly, the process involves mixing the compound to be acetylated in an aqueous solution of sodium hydroxide or potassium hydroxide to form a relatively dilute solution of the compound. The amount of alkali employed may be varied within wide limits, but is generally such that the reaction mixture remains slightly alkaline at the end of the acetylation process.

To the solution of the compound is added crushed ice, in an amount necessary to ensure that some unmelted ice remains at the end of the acetylation process. A slight excess over the amount of acetic anhydride theoretically required to react with the compound is next rapidly stirred into the cooled solution and the resulting mixture is agitated and then permitted to settle. The acetylated compound separates from the mixture and may be recovered by conventional techniques such as vacuum filtration. To obtain a purer product, the aceytlated compound may be recrystallized.

As will be apparent to those of ordinary skill in the art, other known techniques of actylation, such as the sodium acetate catalyzed reaction with acetic anhydride, may be used to form the acetylated forms of the monomers which are used to prepare the polyester.

Preparation of the polyester is typically accomplished by melt polymerization of the monomers. Melt polymerization is achieved by first placing the required molar amounts of the esterified (e.g., acetylated) monomers in a reaction vessel equipped with a mechanical agitator, a gas inlet and a distillation head. Since the presence of oxygen tends to inhibit polymerization, the reaction mixture is typically blanketed with an inert gas, such as nitrogen or argon, at about atmospheric pressure. The reaction vessel is then heated for about 4 to about 8 hours at a temperature ranging from about 230° to about 300° C., preferably from about 240° to about 260° C. At the end of this time, the vessel gradually is evacuated over a period of from about 10 to about 60 minutes to a pressure of from about atmospheric to about 1.0 mm Hg to remove acetic acid from the vessel. The temperature of the vessel is then held in the range of from about 280° to about 320° C., preferably from about 280° to about 300° C., for from about 10 to about 30 minutes.

To inhibit sublimation of the reactants, it is preferable to gradually raise the temperature of the reaction mixture, either incrementally or continuously, throughout the polymerization reaction. The reaction may be further improved by incorporating known amounts of conventional polyester catalysts, such as sodium acetate or antimony trioxide, to increase the rate of polymerization and the molecular weight of the polymer. Recovery of the formed polyester may be accomplished by simply admitting inert gas, cooling the reaction vessel to room temperature and removing the polyester from the vessel.

The polymerization process may be operated on a continuous, semi-continuous or, preferably, on a batch basis.

An alternate process for preparing copolyesters that include ferulic acid is disclosed in U.S. Pat. No. 4,067,852, the content of which is incorporated by reference. As more fully described in the patent, the slurry polymerization technique involves the use of a liquid heat exchange medium which acts as a solvent for at least one of the reactants. The temperature of the mixture is increased and the polymer forms as a fine insoluble solid in the medium. Following cooling of the mixture, recovery of the polymer is accomplished by conventional steps such as decantation, centrifugation or filtration. The separated polymer may then be washed and dried.

The prepared polyester is capable of forming an anisotropic melt (i.e., forms liquid crystals). Anisotropy can be confirmed by standard polarized light techniques whereby cross-polarizers are employed. Although the amount of light transmitted generally increases when a sample is sheared (e.g., by laterally moving the cover slide of a hot stage microscope), the melt is optically anisotropic even in the static state.

Wide variations in melting temperature may occur depending on the type and amount of other constituents in the polyester. However, it generally ranges from about 290° to about 335° C. (as determined by a Differential Scanning Calorimeter at 20° C./minute). Similarly, depending on the constituents and the degree of polymerization obtained, the formed polyester may have an inherent viscosity (I.V) of from about 1.0 to about 5.0 dl./g. when measured as a 0.1% by weight solution in pentafluorophenol at 60° C.

In those instances wherein the ferulic acid monomer is polymerized in the substantial absence of any comonomer, the polyester has the recurring unit:

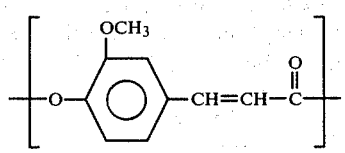

As stated above, the ferulic acid monomer may be copolymerized with other compatible monomers and these monomers will naturally comprise a portion of the polymer structure. When aromatic comonomers are employed, the polyester will include at least one recurring unit selected from the group consisting of:

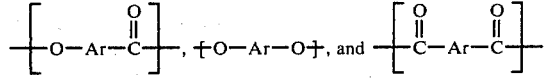

wherein Ar is selected from the group consisting of unsubstituted aryl groups, substituted aryl groups and mixtures thereof.

To form fibers, films or other shaped articles, the polyester is typically melt processed by conventional techniques such as melt spinning, pressure molding, extrusion, etc. In melt processing the polyester, care must usually be taken to avoid thermal degradation of the polymer. That is, it is usually desirable to obtain a stable melt phase. This generally involves a selection of the components forming the polyester and a regulation of the process temperature and pressure. However, to further ensure the integrity of the polymer, conventional anti-oxidants, such as hindered phenolic anti-oxidants represented by Irganox 1010 available from Ciba-Geigy, Corp. and Nonox WSP available from ICI, Inc., may be incorporated into the polyester during the polymerization process. Although the polyester is originally thermoplastic in nature, the formed articles may be post-treated to cross-link the polymer chains through the reactive double bond thus rendering the polymer thermosetting. This may be accomplished by employing mineral acids or ultra-violet radiation as is well established in the art.

The polyesters of the present invention may include one or more known fillers and/or reinforcing agents depending on the desired end use of the polyester. When fibers or films are prepared, the amount of filler and/or reinforcing agent generally ranges from about 1.0 to about 3.0 percent, whereas when molding compounds are formed, the filler and/or reinforcing agent may be present in an amount ranging from about 1.0 to about 60 percent by weight of the total mixture. Exemplary fillers and reinforcing agents are set forth in the aforementioned U.S. Pat. No. 4,067,852.

The following Examples are given as specific illustrations of the process. It should be understood, however, that the invention is not limited to the specific details set forth in the Examples.

EXAMPLE 1

25 grams of ferulic acid are dissolved in 7.7 grams of NaOH and 50 milliliters of H₂O. The solution is cooled by adding 65 grams of ice. 16.7 grams of acetic anhydride is then added. Most of the material coagulates into a sticky, light green mass. This is vacuum filtered and placed in a jar overnight. The mass is recrystallized from acetone to form 11.4 grams of a white powder having a melting point of from about 189° to about 193° C. The powder is recrystallized from 170 milliliters of ethanol and 30 milliliters of H₂O, filtered while hot, refrigerated overnight, vacuum filtered and vacuum oven dried at about 30° C. Infrared analysis indicates that the aceytl ester of ferulic acid is formed.

23 grams of 6-hydroxy-2-naphthoic acid is reacted with 46 grams of acetic anhydride in the presence of sodium acetate. Recovery of the acetylated acid is achieved by pouring the mixture into 500 ml. of deionized water and vacuum filtering.

20.0 grams (0.085 moles) of aceytlferulic acid and 19.49 grams (0.085 moles) of 6-acetoxy-2-naphthoic acid are placed in a 300 ml three necked flask equipped with a mechanical stirrer, nitrogen inlet and a distillation head. The flask is heated by an external oil bath for 2 hours at 235° C., 2 hours and 40 minutes at 250° C. and 30 minutes at 280° C. while the reaction mixture is blanketed with nitrogen. The flask is gradually evacuated to 0.17 mm Hg over a 35 minute period while the temperature is raised to 315° C. After cooling under nitrogen, the flask is opened and the polymer recovered.

The polymer is analyzed and found to have an inherent viscosity of 1.17 dl./g. when measured as a 0.1% by weight solution in pentafluorophenol at 60° C. Analysis by a Differential Scanning Calorimeter at 20° C./minute indicates a glass transition temperature of about 115° C. and the first incidence of melting at about 320° C. Hot stage microscopy through crossed polarizers indicates an anisotropic melt phase at about 330° C.

Fibers spun from the polyester at 300° C. have a tenacity of about 0.49 grams/denier, an elongation of about 0.74, a modulus of about 66.9 grams/denier and 60.3 denier per filament.

EXAMPLE 2

The procedure of Example 1 is repeated except that the molar amounts of the acetylated monomers are 40% ferulic acid, 50% p-hydroxy benzoic acid and 10% vanillic acid. The polyester has a glass transition temperature of about 112° C. and a melting point, accompanied by degradation, of about 300° C. When melt spun at 270° C., the fibers have a tenacity of about 1.03 grams/denier, an elongation of about 1.46, a modulus of about 80.8 grams/denier and 216 denier per filament.

Table I summarizes the results of Examples 3-10 which were obtained using the process of Example 1. In the Table, the percentages indicate the molar amounts of the monomers, the glass transition temperature (Tg) is measured using a Differential Scanning Calorimeter at 20° C./minute and the melting temperature (Tm) indicates the onset of melting using a Differential Scanning Calorimeter at 20° C./minute.

TABLE I

| Example | % Ferulic acid | % p-HBA | % other monomer | Tg | Tm |
|---|---|---|---|---|---|
| 3 | 60 | 0 | 40(a) | 122 | 325 |
| 4 | 25 | 50 | 25(b) | 107 | P |
| 5 | 50 | 50 | 0 | 120 | 340** |
| 6 | 25 | 50 | 25(c) | 140 | 300 |
| 7 | 25 | 50 | 25(c) | 137 | 295 |
| 8 | 100 | 0 | 0 | 150 | 325** |
| 9 | 40 | 50 | 10(d) | 107 | 335** |
| 10 | 40 | 50 | 10(e)* | 110 | 325** |

(a) = 6-hydroxy-2-naphthoic acid
(b) = 3-bromo-4-hydroxy benzoic acid
(c) = meta-hydroxy-benzoic acid
(d) = 3-chloro-4-hydroxy benzoic acid
(e) = vanillic acid
* = Polymerized with 0.05% by weight Sb₂O₃
** = melting accompanied by degradation
P = not calculated Although the invention has been described with preferred embodiments, it is to be understood that variations and modifications may be resorted to as will be apparent to those skilled in this art. Such variations are to be considered within the scope of the following claims.

I claim:

1. A thermotropic polyester capable of forming an anisotropic melt having the recurring unit:

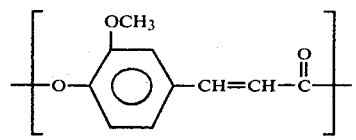

and at least one recurring unit selected from the group consisting of:

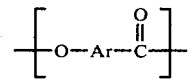

and stoichiometrically balanced amounts of

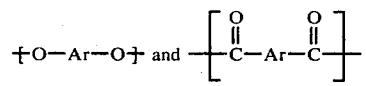

wherein Ar is selected from the group consisting of unsubstituted aryl groups, compatibly substituted aryl groups and mixtures thereof.

2. The thermotropic polyester of claim 1 including the recurring unit:

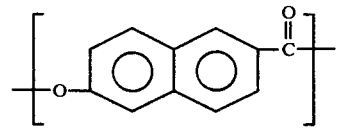

3. The thermotropic polyester of claim 1 including the recurring units:

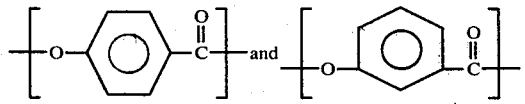

4. The thermotropic polyester of claim 1 including the recurring units:

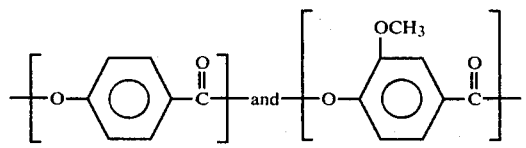

5. A process for preparing a thermotropic polyester capable of forming an anisotropic melt comprising:
 (a) esterifying a monomer having the formula;

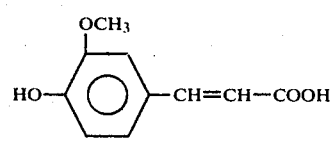

(b) heating the esterified monomer to a temperature of from about 230° to about 300° C. for from about 4 to about 8 hours;

(c) reducing the ambient pressure to from about atmospheric to about 1.0 mm. Hg;

(d) heating to a temperature of from about 280° to about 320° C. for from about 10 to about 30 minutes; and (e) recovering the polyester.

6. The process of claim 5 wherein the monomer is acetylated.

7. The process of claim 6 wherein steps (b), (c) and (d) are performed in the substantial absence of oxygen.

8. The process of claim 6 wherein at least one further reactant having a formula selected from the group consisting of:

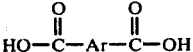

and stoichiometrically balanced amounts of HO-Ar-OH and $$HO-\overset{\overset{O}{\|}}{C}-Ar-\overset{\overset{O}{\|}}{C}-OH$$

wherein Ar is selected from the group consisting of unsubstituted aryl groups, compatibly substituted aryl groups and mixtures thereof, is acetylated and mixed with the acetylated monomer of step (a).

* * * * *